US005507568A

United States Patent [19]
Cook et al.

[11] Patent Number: 5,507,568
[45] Date of Patent: * Apr. 16, 1996

[54] BRAKE ENERGY BALANCING SYSTEM FOR MULTIPLE BRAKE UNITS

[75] Inventors: Robert D. Cook, Valencia; Bijan Salamat, Santa Clarita, both of Calif.

[73] Assignee: Hydro-Aire Division of Crane Company, Burbank, Calif.

[*] Notice: The portion of the term of this patent subsequent to Feb. 21, 2012, has been disclaimed.

[21] Appl. No.: 318,470

[22] Filed: Oct. 5, 1994

Related U.S. Application Data

[63] Continuation of Ser. No. 157,692, Nov. 24, 1993, Pat. No. 5,390,990.

[51] Int. Cl.$^6$ ............................................... B60T 8/58
[52] U.S. Cl. ......................... 303/135; 188/181 T; 303/7; 303/9.61; 303/112
[58] Field of Search ........................... 303/112, 93, 100, 303/7, 3, 20, 102, 103, 110, 106, 105, 9.61; 188/181 T, 188 C, 181 R, 181 A, 3 R, 3 H; 244/111; 246/182 B; 364/426.01, 426.02, 426.05, 426.06

[56] References Cited

U.S. PATENT DOCUMENTS

| | | |
|---|---|---|
| Re. 30,763 | 10/1981 | Hirzel et al. . |
| Re. 33,486 | 12/1990 | Hirzel et al. . |
| 3,574,417 | 4/1971 | Howard et al. . |
| 3,578,819 | 5/1971 | Atkins . |
| 3,587,798 | 6/1971 | Schuman . |
| 3,604,760 | 9/1971 | Atkins . |
| 3,614,174 | 10/1971 | Romero . |
| 3,682,512 | 8/1972 | Malon et al. . |
| 3,702,714 | 11/1972 | Branson . |
| 3,711,163 | 1/1973 | Booher . |
| 3,829,167 | 8/1974 | Rouf et al. . |
| 4,043,607 | 8/1977 | Signorelli et al. . |
| 4,105,258 | 8/1978 | Bornfleth . |
| 4,768,840 | 9/1988 | Sullivan et al. . |
| 5,312,168 | 5/1994 | Breen . |
| 5,390,990 | 2/1995 | Cook et al. ................................ 303/93 |

OTHER PUBLICATIONS

Motohiro Igarashi, et al. Digital Brake Control System for Mag–lev Trains, presented at S'Tech '93 (International Conference on Speedup Technology for Railway and MAGLEV Vehicles), Nov. 1993, Yokohama, Japan.

Primary Examiner—Douglas C. Butler
Attorney, Agent, or Firm—Fulwider Patton Lee & Utecht

[57] ABSTRACT

The brake energy balancing system balances brake torque of braking wheels of a vehicle having a plurality of cars carried by trucks, for applying and controlling the brakes of each group of braking wheels of the trucks of the vehicle. Brake torque is measured, a command brake torque signal is generated that is limited by a reference torque signal, and the command brake torque signal is compared with the measured brake torque to generate brake torque difference signals. An energy balancing brake application control signal is provided to the brakes in response to the brake torque difference signals.

8 Claims, 7 Drawing Sheets

BRAKE ENERGY BALANCING SYSTEM FOR MULTIPLE BRAKE UNITS

This is a continuation of application Ser. No. 08/157,692, filed Nov. 24, 1993, now U.S. Pat. No. 5,390,990.

BACKGROUND OF THE INVENTION

1. Field of the Invention

This invention relates generally to deceleration control systems for vehicles, and more particularly concerns a brake energy balancing system for multiple brake units using multiple independent brake controllers to control deceleration by maintaining braking torque constant or within a desired torque range.

2. Description of Related Art

Anti-skid and automatic braking systems have been commonly provided on commercial aircraft to aid the deceleration of the aircraft upon landing. Modern anti-skid systems commonly optimize braking efficiency by adapting to runway conditions and other factors affecting braking to maximize deceleration, corresponding to the level of brake pressure selected by the pilot. Such brake units have been proposed for use in emergency braking systems for magnetic levitation (MAG-LEV) trains for emergency deceleration in the event of failure of the primary braking system. However, MAG-LEV trains commonly have articulated trucks with numerous sets of independent brake units, over which brake pressure can differ, so that the energy absorbed by different brakes during braking can vary. It has been found that during braking of vehicles with independent controllers and brake units, such as in a train, can suffer from an energy imbalance among the brake units, despite anti-skid and autobrake deceleration control.

The causes of divergence of brake pressure can be attributed to (a) differences in the rolling radii of train wheels, (b) differences in electronic components, (c) brake torque differences, and the like. Each of these can create a measured 'error' in the deceleration. When imbalances in braking energy occur, brake units that absorb more energy can fail temporarily, or become permanently damaged. It would, therefore, be desirable that the braking energy absorbed by the brake units of the trucks and cars of a train be equalized as much as possible. Conventional brake control systems having anti-skid and autobrake functions have been found to be insufficient to achieve such brake energy equalization among multiple independent brake units.

One prior art method for avoiding brake pressure imbalances in aircraft brakes equalizes the pressure at all wheels in auto-brake mode, with brake torque limiting as an auxiliary control mechanism. However, the anti-skid and autobrake functions are controlled by measuring velocity using a speed sensor. Since deceleration is determined from wheel speed, the calculation of deceleration from one truck to the next can be off by a factor related to the tolerance within the system. Such a tolerance deviation in determination of deceleration can cause a brake energy imbalance in the braking effort among trucks linked in a chain. Without an energy balancing method, a major portion of the braking effort can thus be borne by few of the trucks. In an emergency braking situation, one car can push or pull against an adjacent car, causing unsafe jostling of the train cars, which can be particularly dangerous for high speed trains. It is, therefore, desirable that in order to equalize brake energy, torque value of each brake should be measured and controlled. Thus, it would be desirable to employ an auto-torque braking energy balancing system and method that would maintain deceleration torque to a constant value or range of values. The present invention addresses these needs.

SUMMARY OF THE INVENTION

Briefly, and in general terms, the present invention provides for a system and method of balancing brake energy for multiple brake units, by balancing brake torque on the brake wheels of a multi-car or multi-truck vehicle, such as a train. Torque feedback control permits the balancing of the torque among the brakes on each car of the multi-car vehicle, preventing potentially dangerous emergency braking conditions, particularly for high speed multi-car vehicles such as a MAG-LEV train.

The invention accordingly provides for a brake energy balancing system for a vehicle having a plurality of cars, each carried by a pair of trucks, with each truck having a group of braking wheels with brakes, for applying and controlling the brakes of each group of braking wheels of the vehicle independently of operator brake application. During braking, brake torque is measured to generate brake torque signals that are a function of the braking torque applied to each braking wheel. A command brake torque signal is generated by a command brake torque signal generating means in response to a deceleration command, preferably limited by a reference torque signal. The command brake torque signal is compared with the measured brake torque signals, for generating brake torque difference signals indicative of the difference between the brake torque signals and the command brake torque signal. Brake pressure is applied to the braking wheels by brake application means independently of operator brake application, and an energy balancing brake application control signal is provided to the brake application means by control means to control the brake application means independent of operator brake application, in response to the brake torque difference signals.

In a preferred embodiment, wheel velocity is measured to produce wheel velocity signals that are a function of the rotational speed of each wheel, and an average velocity signal is generated based upon the wheel velocity signals for each group of wheels for each truck. A reference velocity signal is also preferably generated in response to a deceleration command, and the average velocity signal for each group of wheels is compared with the reference velocity signal for generating average velocity error signals indicative of the difference between the average wheel velocity signals and the reference velocity signal. The wheel velocity signals are preferably compared with the reference velocity signal for generating individual wheel velocity error signals indicative of the difference between the wheel velocity signals and the reference velocity signal.

These and other aspects and advantages of the invention will become apparent from the following detailed description, and the accompanying drawings, which illustrate by way of example the features of the invention.

DETAILED DESCRIPTION OF A PREFERRED EMBODIMENT

Anti-skid and autobrake brake systems typically used for aircraft have been proposed for use as emergency braking systems for MAG-LEV trains for emergency deceleration in the event of failure of the primary braking system. However, brake pressure can vary over the articulated trucks of a MAG-LEV train, so that the energy absorbed by different brakes during braking can create an energy imbalance among the brake units during braking, potentially causing the brakes to fail or damaging them permanently. Conventional anti-skid and autobrake control systems do not sufficiently provide for energy balancing of brake units to prevent these kinds of problems in an emergency braking system of MAG-LEV trains and the like.

Figure 1:
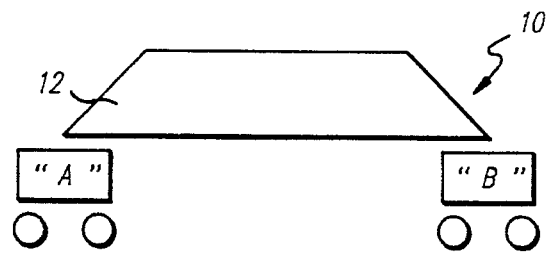
FIG. 1 is a simplified diagram of a train car carried by two bogie trucks "A" and "B"
Figure 4A:
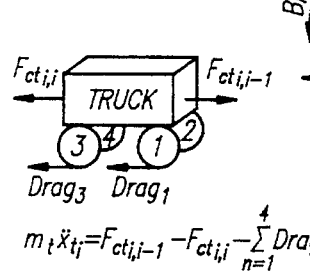
FIGS. 4(A) and 4(B) are a schematic diagram of a three car vehicle for an energy balance analysis.
Figure 4A:
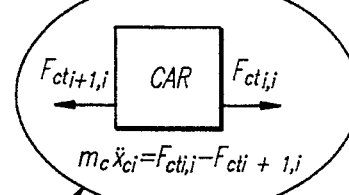
Figure 4A:
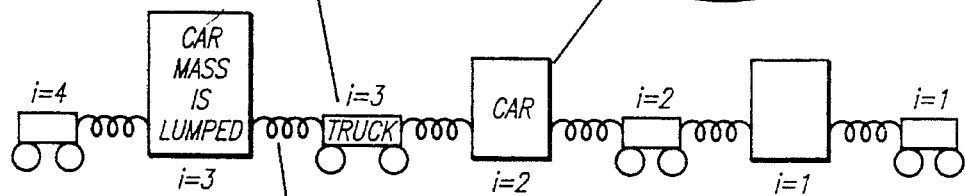

With reference to FIG. 1, in a car which has two trucks, if both trucks have programmed deceleration values of 0.2 G's and truck "A" is measuring 0.199 and truck "B" is measuring 0.201, then the overall programmed deceleration value of 0.2 would seem to be achieved. However, the individual trucks do not each achieve the programmed deceleration; and as a result, truck "A" will increase brake pressure to achieve a 0.2 G deceleration rate and truck "B" will decrease brake pressure to achieve the 0.2 deceleration rate. While truck "A" is increasing deceleration and truck "B" is decreasing deceleration, the total car deceleration will remain at 0.2 G's. However, at some point in time, truck "A" will accomplish most of the programmed deceleration and truck "B" will be achieving significantly less, resulting in a braking energy imbalance. In a high speed MAG-LEV train, such braking energy imbalances can be magnified catastrophically, causing dangerous braking conditions.

Figure 2:
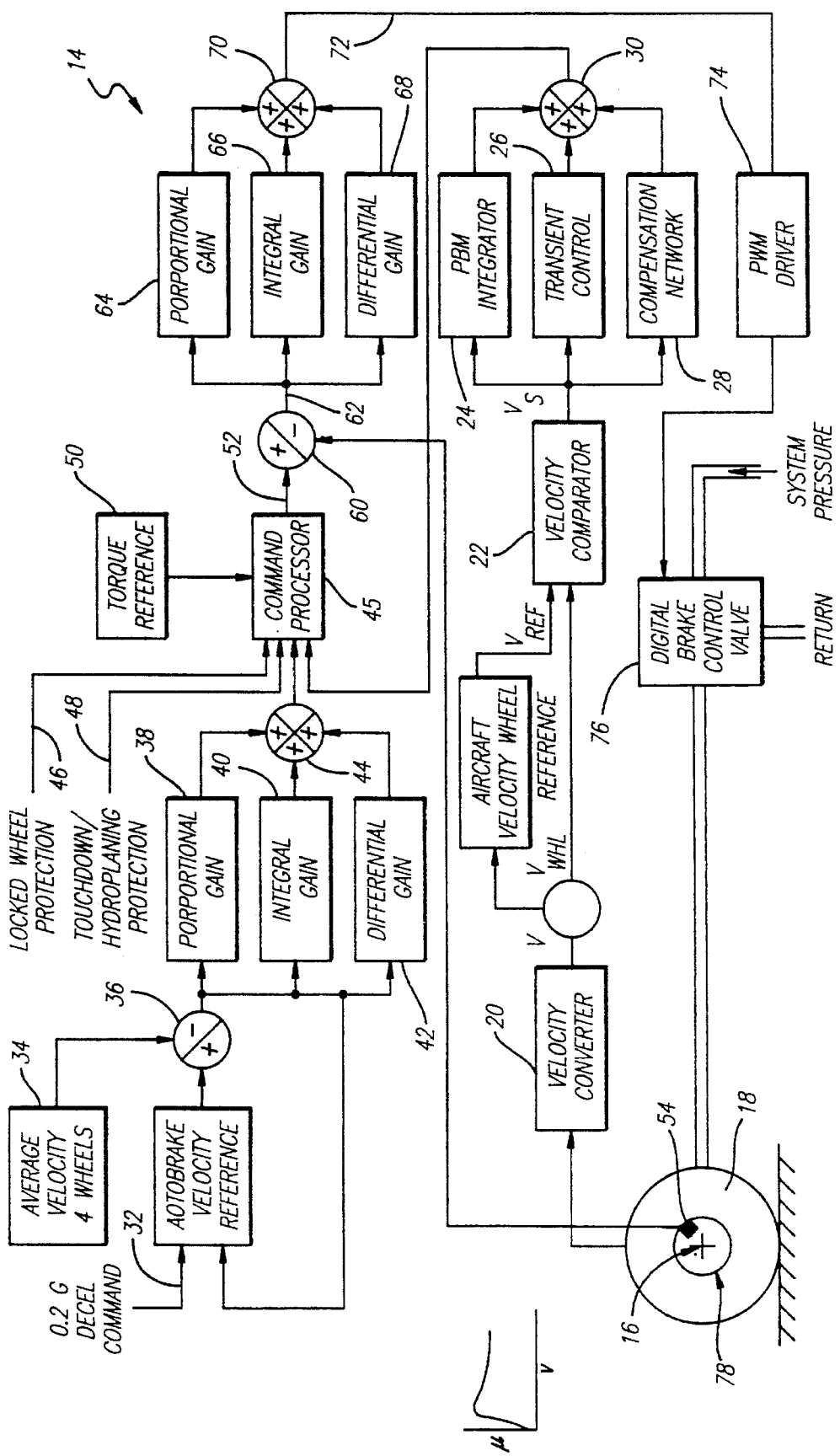
FIG. 2 is a simplified schematic diagram of a brake energy balancing system for multiple brake units according to the present invention.

As is illustrated in the drawings, a brake energy balancing system according to the principles of the invention can be used in a vehicle 10 such as a MAG-LEV train, or other types of trains and the like, having a plurality of trucks "A" and "B" carrying a plurality of cars 12 each having a group of braked wheels, such as is illustrated in FIG. 1. Referring to FIG. 2, the brake energy and balance system 14 as installed for a MAG-LEV train would preferably include a wheel speed transducer 16 for each brake wheel 18 of a truck, for measuring wheel speed and generating wheel velocity signals that are a function of the rotational speed of the brake wheel. The wheel velocity signal is typically converted to a signal representing the velocity of the vehicle by a velocity converter 20, and compared with a desired reference vehicle velocity in velocity comparator 22, to generate individual wheel velocity error signals indicative of the difference between the wheel velocity signals from each braked wheel and the reference velocity signal. The velocity error signals are adjusted by a pressure bias modulator control circuit (PBM) integrator 24, transient control circuitry 26 for filtering transient signals, and compensation network circuitry 28, the outputs of which are summed at summing junction 30 to provide an anti-skid control signal received by the command processor, typically a microprocessor.

A deceleration command 32, typically for a deceleration force of approximately 0.2 G for emergency deceleration of the MAG-LEV train, activates an autobrake velocity reference generating means to generate an autobrake reference velocity signal in response to the deceleration command. Wheel velocity averaging means 34 are provided for generating an average velocity signal based upon the wheel velocity signals from each group of wheels for each truck. The difference between the autobrake reference velocity signal and the average velocity signals is determined by average velocity comparator 36 for generating average velocity error signals that are indicative of the difference between the average wheel velocity signals and the reference velocity signal. The average velocity error signals are typically adjusted by a proportional velocity gain by proportional gain circuitry 38, an integral velocity gain by integral gain circuitry 40, and a differential velocity gain by differential gain circuitry 42, the outputs of which are summed at summing junction 44 to provide an adjusted autobrake signal that is received by the command processor 45. Other signals and inputs can be received by the command processor, such as a locked wheel signal 46 indicating whether a wheel is locked, and a touchdown/hydroplaning protection signal 48, to guard against hydroplaning of a wheel on touchdown at high speeds.

In a preferred aspect of the invention, the command processor determines a torque controlled brake application signal necessary to achieve the commanded deceleration, an in another preferred aspect of the invention the torque control can be incorporated with anti-skid, autobrake deceleration control for achieving the commanded deceleration. Thus, the present invention also significantly provides for a brake torque reference signal input 50 to the command processor to limit the torque output signal 52 of the command processor to a range of torque values appropriate for braking cars that are neither full nor empty, and preferably to a torque value appropriate for a car that is carrying approximately half of its rated load. Assuming that an empty car weighs approximately 38% of a fully loaded one, limiting the torque to such a reference value would balance the braking energy among all of the cars of the train to within 10%. With this model, the actual deceleration can vary from approximately 0.18 to approximately 0.25 G.

The invention also preferably provides for torque sensors 54 at each brake wheel 18 for generating feedback brake torque signals that are a function of the braking torque applied to each wheel. The brake torque signals are compared with the anti-skid, autobrake torque signal output 52 of the command processor at torque comparator 60 for determining a torque difference signal 62. The torque difference signal is also preferably adjusted by a proportional torque gain by proportional torque gain circuitry 64, an integral torque gain by integral torque gain circuitry 66, and a differential torque gain by differential torque gain circuitry 68, the outputs of which are summed at summing junction 70 to provide an adjusted autotorque signal 72. The autotorque signal is received by a brake pressure wheel modulator (PWM) driver 74 to convert the autotorque signal to a digital brake control signal applied to the digital brake control valve 76 that controls the pressurized brake fluid to the brake 78.

Figure 3:
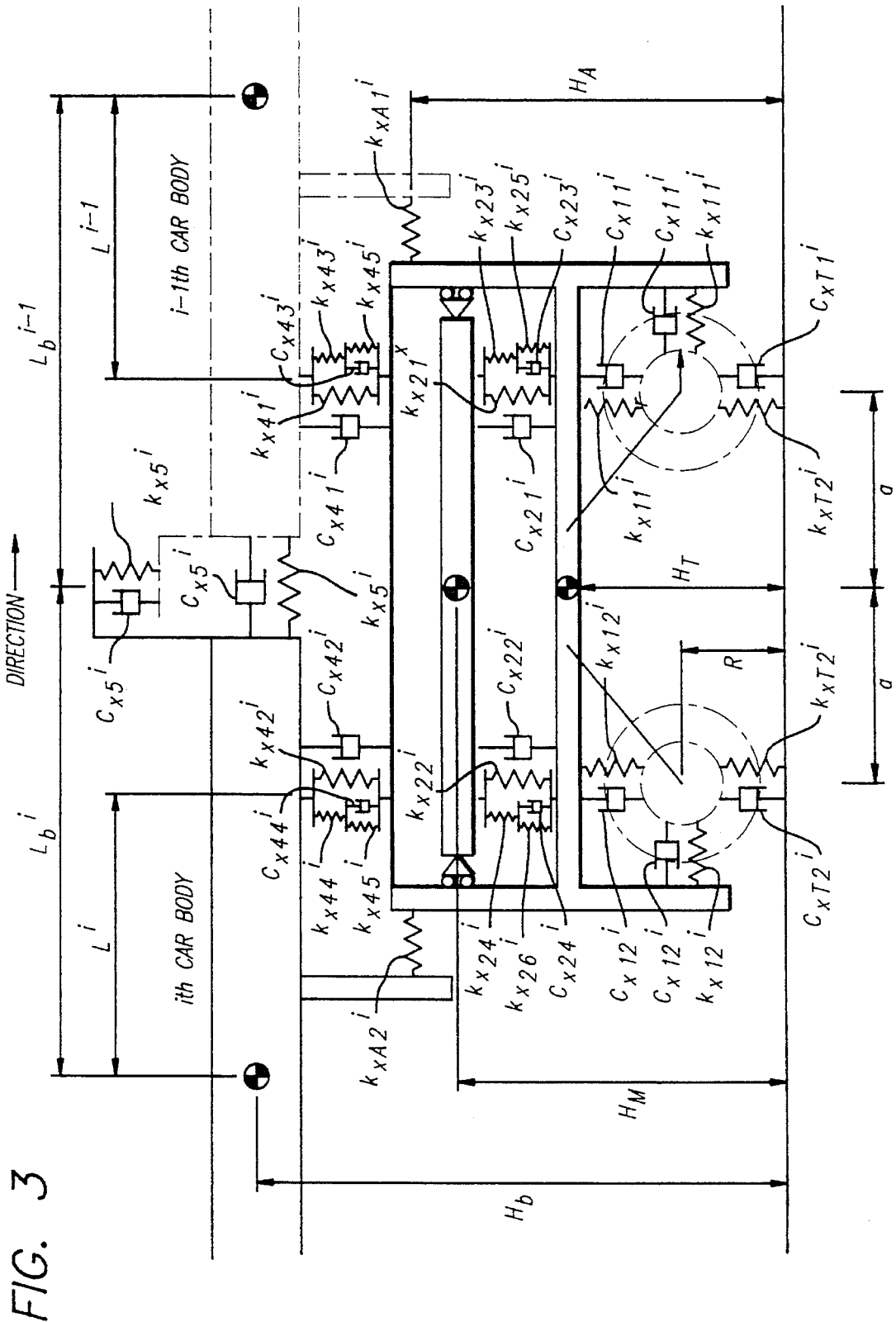
FIG. 3 is a detailed diagram of a truck carrying two train cars of a train vehicle having multiple brake units.
Figure 4B:
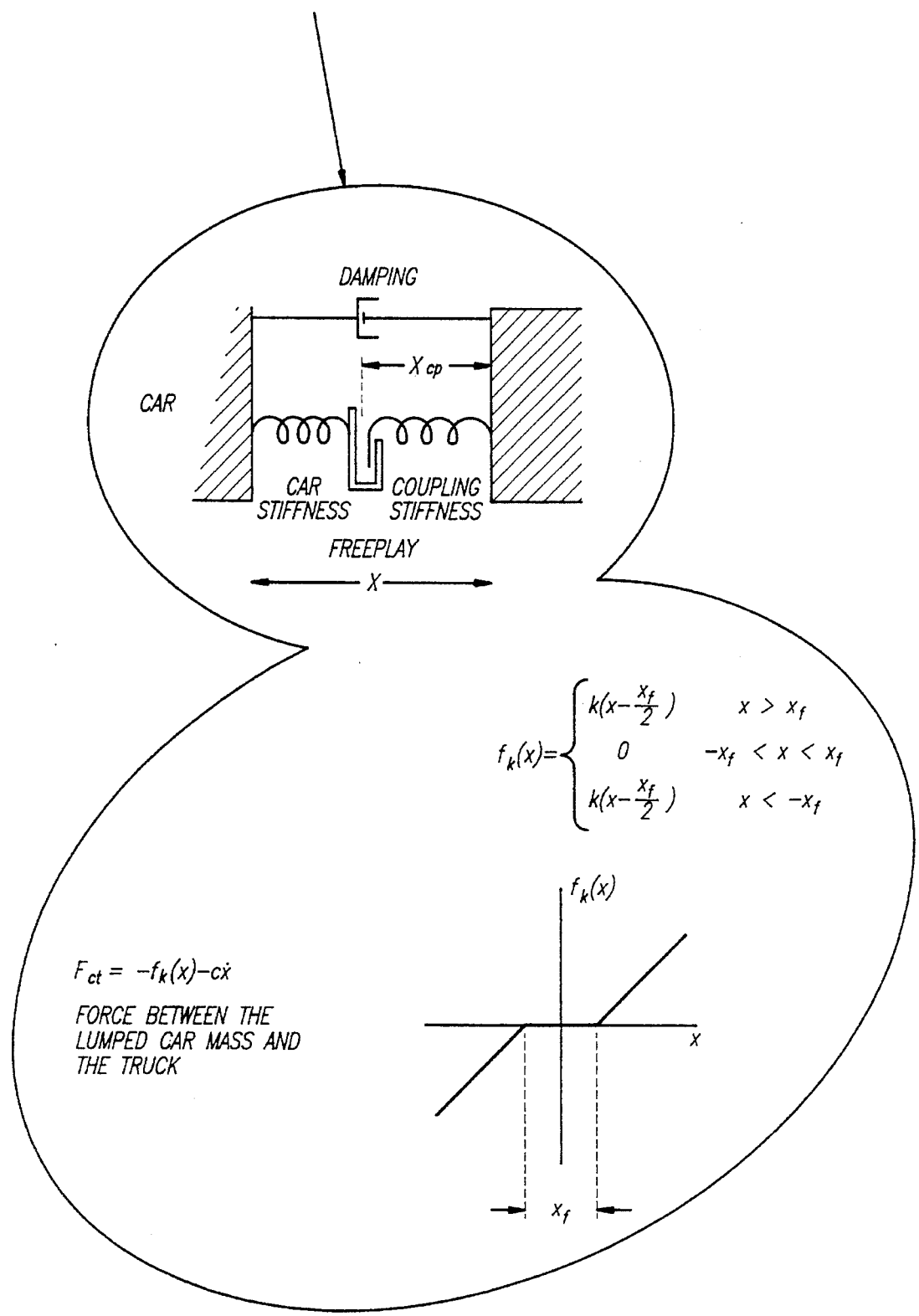

Analysis of the most severe braking conditions for MAG-LEV trains assumed a vehicle velocity of approximately 500 km/h (about 310 mph) as the initial braking speed, giving an absorbed braking energy of approximately 57 MJ. Analysis was performed to determine brake distance, riding quality, wheel load variation due to possible pitching motion, and general brake performance. Since MAG-LEV trains typically have cars carried on articulated bogie trucks, a first vehicle model consisting of end cars carried by a middle truck was considered, as illustrated in FIG. 3, showing an ith truck between ith and i-lth car bodies, for a train having n car bodies carried by n+1 trucks. For such a model, the wheel load variation and deceleration as brake performance can be obtained by the following equations:

Truck Front Wheel Vertical Oscillation:

$$m_w^i \ddot{z}_{w1}^i = -(c_{zT1}^i + c_{z11}^i)\dot{z}_{w1}^i + c_{z11}^i \dot{z}_T^i - c_{z11}^i a^i \dot{\theta}_T^i - \quad (1)$$

$$(k_{zT1}^i + k_{z11}^i)z_{w1}^i + k_{z11}^i z_T^i - k_{z11}^i a^i \theta_T^i + c_{zT1}^i \dot{z}_1^i + k_{zT1}^i z_1^i$$

Truck Rear Wheel Vertical Oscillation:

$$m_w^i \ddot{z}_{w2}^i = -(c_{zT2}^i + c_{z12}^i)\dot{z}_{w2}^i + c_{z12}^i \dot{z}_T^i + c_{z12}^i a^i \dot{\theta}_T^i - \quad (2)$$

$$(k_{zT2}^i + k_{z12}^i)z_{w2}^i + k_{z12}^i z_T^i + k_{z12}^i a^i \theta_T^i + c_{zT2}^i \dot{z}_1^i + k_{zT2}^i z_1^i$$

Car Body Longitudinal Oscillation:

$$m_b^i \ddot{x}_b^i = +c_{xs}^i \dot{x}_b^{i-1} + c_{xs}^i h_{12}^i \dot{\theta}_b^{i-1} + \quad (3)$$

$$c_{x42}^i \dot{x}_T^i - (c_{x42}^i + c_{x41}^{i+1} + c_{xs}^i + c_{xs}^{i+1})\dot{x}_b^i - c_{x42}^i h_2^i \dot{\theta}^i -$$

$$(c_{x42}^i h_3^i + c_{x41}^{i+1} h_3^{i+1} + c_{xs}^i h_{12}^i + c_{xs}^{i+1} h_{11}^{i+1})\dot{\theta}_b^i + c_{x4}^{i+1} \dot{x}_T^{i+1} +$$

$$c_{xs}^{i+1} \dot{x}_b^{i+1} - c_{x4}^{i+1} h_2^{i+1} \dot{\theta}_T^{i+1} + c_{xs}^{i+1} h_{12}^{i+1} \dot{\theta}_b^{i+1} + k_{xs}^i x_b^{i-1} +$$

$$k_{xs}^i h_{13}^i \theta_b^{i-1} + (k_{x42}^i + k_{A2}^i)x_T^i - (k_{x42}^i + k_{x41}^{i+1} + k_{xs}^i +$$

$$k_{xs}^{i+1} + k_{A2}^i + k_{A1}^{i+1})x_b^i - (k_{x42}^i h_4^i + k_{A2}^i h_{10}^i)\theta_T^i -$$

$$(k_{x42}^i h_5^i + k_{x4}^{i+1} h_5^{i+1} + k_{xs}^i h_{13}^i + k_{xs}^{i+1} h_{13}^{i+1} + k_{A2}^i h_{11}^i +$$

$$k_{A1}^{i+1} h_{11}^{i+1})\theta_b^i + (k_{x41}^{i+1} + k_{A1}^{i+1})x_T^{i+1} + k_{xs}^{i+1} x_b^{i+1} -$$

$$(k_{x41}^{i+1} h_4^{i+1} + k_{A1}^{i+1} h_{10}^{i+1})\theta_T^{i+1} + k_{xs}^{i+1} h_{13}^{i+1} \theta_b^{i+1}$$

TABLE 1

Example of Simulation Results

| | Axle Control High μ | | Truck Control High μ | | Axle Control Low μ | | Truck Control Low μ | |
|---|---|---|---|---|---|---|---|---|
| Wheel | min. | max. | min. | max. | min. | max. | min. | max. |
| 11 | 0.0 | 6.6 | 0.0 | 6.6 | 0.0 | 7.0 | 0.0 | 6.8 |
| 12 | −3.5 | 0.0 | −3.5 | 0.0 | −3.9 | 0.0 | −3.8 | 0.0 |
| 21 | 0.0 | 5.1 | 0.0 | 5.1 | 0.0 | 5.3 | 0.0 | 5.3 |
| 22 | −5.4 | 0.0 | −5.4 | 0.0 | −5.6 | 0.0 | −5.8 | 0.0 |
| 31 | 0.0 | 5.4 | 0.0 | 5.4 | 0.0 | 5.8 | 0.0 | 5.3 |
| 32 | −5.9 | 0.0 | −5.9 | 0.0 | −6.6 | 0.0 | −5.5 | 0.0 |
| 41 | 0.0 | 3.7 | 0.0 | 3.7 | 0.0 | 3.9 | 0.0 | 4.0 |
| 4.2 | −6.1 | 0.0 | −6.1 | 0.0 | −6.2 | 0.0 | −6.2 | 0.0 |

Table 1 shows an example of results of a simulation done for the case of braking from approximately 500 km/h (310 mph), assuming the cases of high and low friction coefficients (μ). In the wheel numbers listed, the first digit represents the number of the truck, while the second digit represents the number of the axle of the truck. The maximum variation of 7% occurs in the case of axle control and a condition of a low coefficient of friction.

ENERGY BALANCE SIMULATION

If there is no method of equalizing the energy of braking (for an autobrake system), the hydraulic oil pressures sent to the brakes for applying braking pressure will be different for different brakes. Referring to the simple model illustrated in FIG. 1, although deceleration of each car is controlled to a set limit of 0.2 G, for example, the individual bogie truck brake controllers may measure deceleration slightly more or less than 0.2 G. For example, the rear truck "B" brake controller may measure 0.19 G, such as may occur due to the tires having a slightly larger than normal tire radius, and the front truck "A" brake controller may measure 0.21 G, such as for example might be due to the tires having a slightly smaller than normal tire radius, resulting in a net car deceleration of 0.2 G. It becomes obvious that in order for the two brake controllers to have a net 0.2 G deceleration, the front truck "A" brake controller must decrease its hydraulic oil pressure, and the rear truck "B" brake controller must increase its hydraulic oil pressure. Although the total deceleration of the car is maintained at 0.2 G by each controller, this divergence in hydraulic pressure could result in a total release of brakes on the front truck "A", producing unbalanced energy of braking. This is referred to as hydraulic oil pressure divergence behavior. Where braking of the same car with trucks "A" and "B" is velocity controlled, the situation is the adverse of the case for deceleration control.

Such a divergence in braking pressure will be affected by the tire radius, wheel initial load and load variation during braking, and the coefficient of friction of the carbon disc in carbon brakes. The scatter of tire radius is considered to be ±2.0%, including new tire precision, elongation by rotation, and wear. The initial vehicle load has the difference of about 20% in empty and full man load, and this value is converted to ±0.7% in tire radius. The wheel load variation due to pitching motion was found to be 7%, which is ±0.5% for tire radius. Totally, the scatter of tire radius is ±3.2%. As for the scatter of the frictional coefficient, it is said to be from 0.1 for RTO conditions to 0.5 for taxiing. The scatter in MAG-LEV discs can be larger than this range, because the emergency brake system is not likely to be used for a long time, and wear particle or oil contamination can cause a larger variation of the frictional coefficient.

Referring to the three car vehicle model illustrated in FIG. 4, assuming the difference in tire radius and the ratio of brake torque and oil pressure for each unit, as shown in Table 2, a simulation of the braking characteristics of the trucks of the three car vehicle was performed. The calculation was performed for the case of only anti-skid and autobrake control, with the results shown in FIGS. 5 and 6, and for the case of additional torque control, with the results shown in FIG. 7. The units with a smaller tire radius tend to decrease brake pressure, absorbing lower energy. The units with a larger tire radius tend to increase brake pressure, absorbing more energy. With torque control applied, energy absorption is balanced, as is illustrated in FIG. 7.

TABLE 2

Estimated Values for a Three Car Simulation.

| | | Tire Radius (mm) | Torque Gain (Nm/MPa) |
|---|---|---|---|
| fl 1 | 1st truck front axle, left wheel | 0.40 | 1.56 × 10³ |
| fr 1 | 1st truck front axle, rt. wheel | 0.37 | 1.38 × 10³ |
| rl 1 | 1st truck rear axle, left wheel | 0.37 | 1.77 × 10³ |

TABLE 2-continued

Estimated Values for a Three Car Simulation.

| | | Tire Radius (mm) | Torque Gain (Nm/MPa) |
|---|---|---|---|
| rr 1 | 1st truck rear axle, rt. wheel | 0.43 | $1.97 \times 10^3$ |
| fl 2 | 2d truck front axle, left wheel | 0.37 | $1.68 \times 10^3$ |
| fr 2 | 2d truck front axle, rt. wheel | 0.37 | $1.56 \times 10^3$ |
| rl 2 | 2d truck rear axle, left wheel | 0.37 | $1.77 \times 10^3$ |
| rr 2 | 2d truck rear axle, rt. wheel | 0.40 | $1.88 \times 10^3$ |
| fl 3 | 3d truck front axle, left wheel | 0.43 | $1.97 \times 10^3$ |
| fr 3 | 3d truck front axle, rt. wheel | 0.40 | $1.88 \times 10^3$ |
| rl 3 | 3d truck rear axle, left wheel | 0.43 | $2.17 \times 10^3$ |
| rr 3 | 3d truck rear axle, rt. wheel | 0.37 | $1.68 \times 10^3$ |
| fl 4 | 4th truck front axle, left wheel | 0.43 | $1.97 \times 10^3$ |
| fr 4 | 4th truck front axle, rt. wheel | 0.40 | $1.88 \times 10^3$ |
| rl 4 | 4th truck rear axle, left wheel | 0.43 | $1.97 \times 10^3$ |
| rr 4 | 4th truck rear axle, rt. wheel | 0.37 | $1.68 \times 10^3$ |

The test conditions are listed in Table 3. Test No. 1–3 are for anti-skid and autobrake performance, and the load for No. 2 is lower than the others to make skidding occur more easily. Test No. 4 included torque control according to the principles of the invention. Since the dynamometer uses only one wheel, deceleration control and torque control were not applied simultaneously.

TABLE 3

Test Conditions.

| Item | | Test No. | Control | Wheel Load (N) |
|---|---|---|---|---|
| Initial speed (km/h) | 500 | 1 | Deceleration of 0.20 G | $5.39 \times 10^4$ |
| Energy absorbed (MJ) | 57 | 2 | Deceleration of 0.20 G | $3.92 \times 10^4$ |
| Brake unit used | Brake unit for 22 in. wheel with torque sensing | 3 | Deceleration of 0.25 G | $5.39 \times 10^4$ |
| Brake unit used | Brake unit for 22 in. wheel with torque sensing | 4 | Deceleration of 0.25 G | $5.39 \times 10^4$ |

Figure 5:
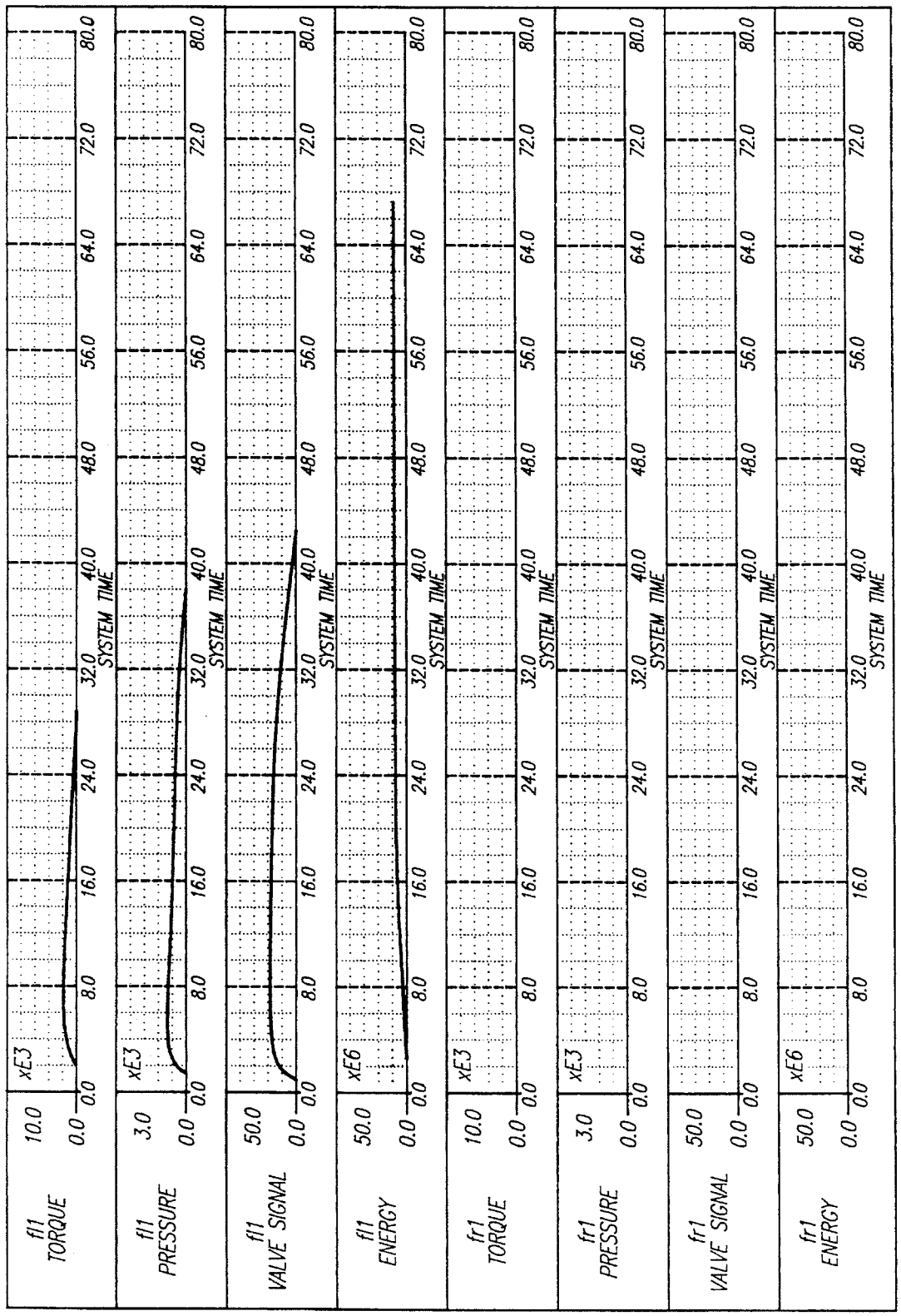
FIG. 5 is a chart illustrating brake characteristics of brakes of a front axle of a truck without the torque control of the invention.
Figure 6:
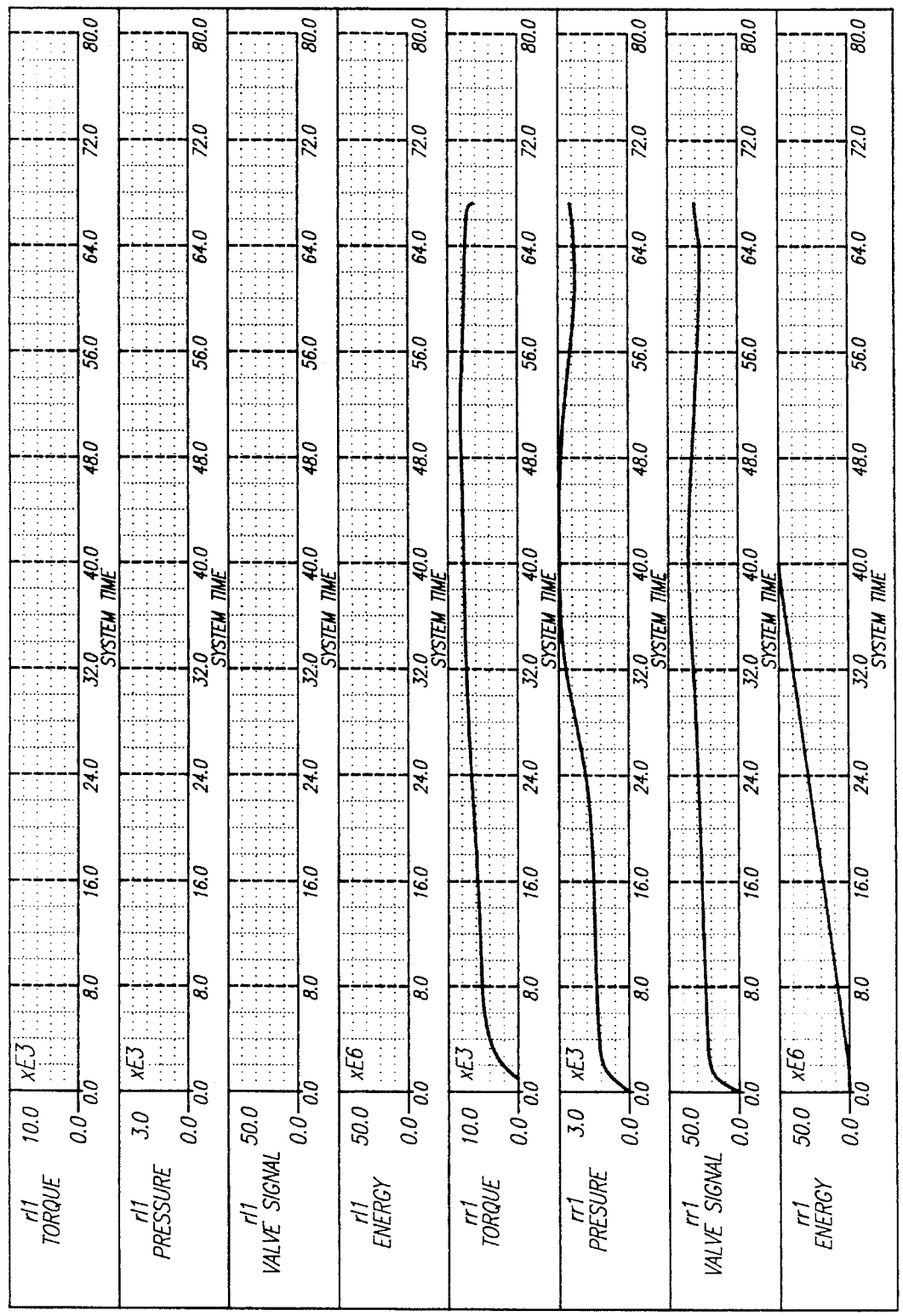
FIG. 6 is a chart illustrating brake characteristics of brakes of a rear axle of a truck without the torque control of the invention.
Figure 7:
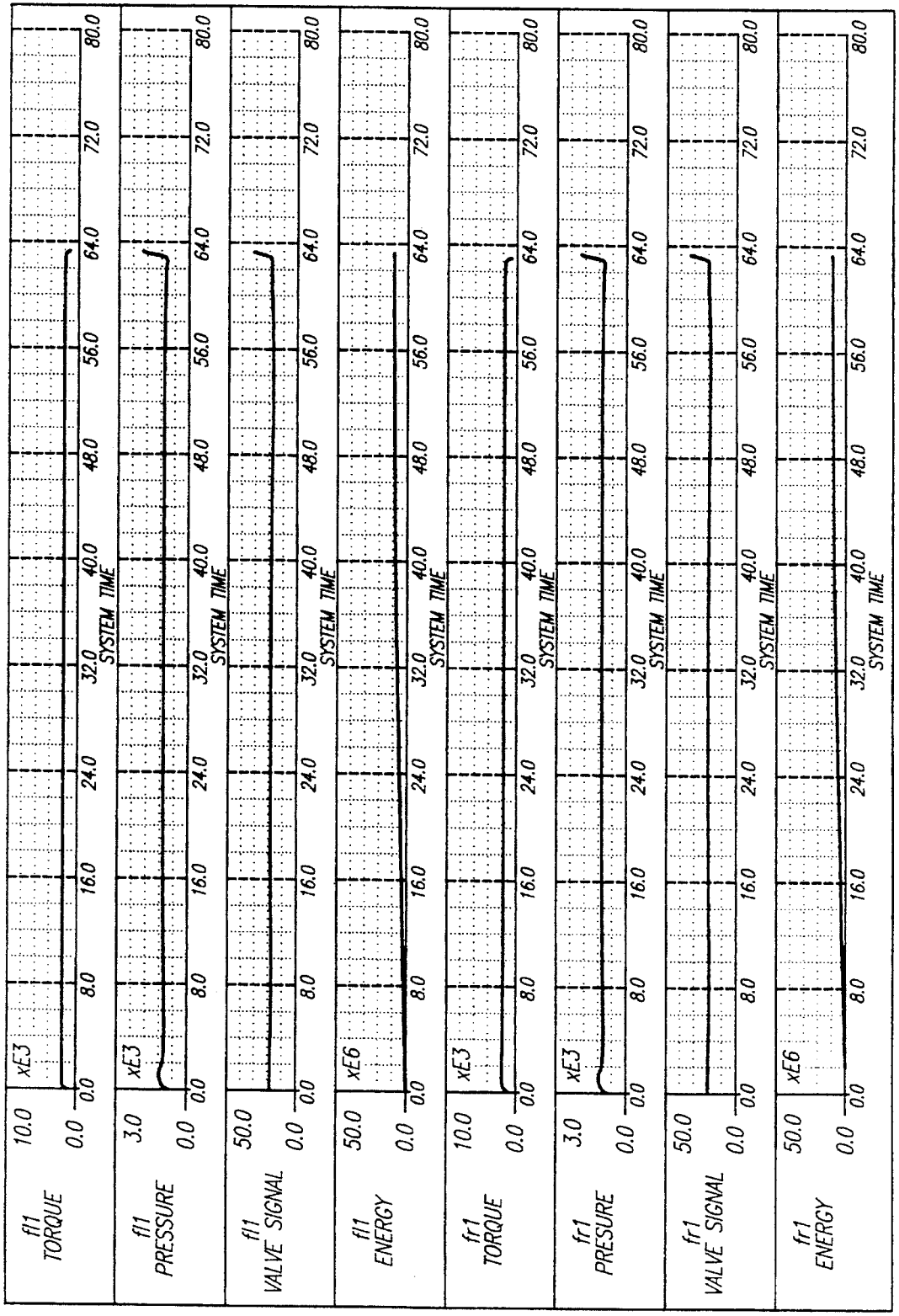
FIG. 7 is a chart illustrating brake energy balancing of a front axle of a truck utilizing torque control according to the principles of the invention.

The results of the dynamometer tests are shown in FIGS. 5, 6 and 7, showing the variations with time of torque, oil pressure, drum speed, and test wheel speed. When deceleration rate is controlled, the torque will not be constant. Thus, when deceleration rate is controlled, the torque should be controlled within a desired range of torque values. Within such a predetermined range of torques, the deceleration, i.e. autobraking, becomes the primary factor to be controlled.

It has thus been demonstrated that the present invention provides for a system and method for balancing brake energy for multiple brake units of a multicar vehicle. This is accomplished by providing torque feedback control for balancing brake torque on the brake wheels of the vehicle, which can be provided in addition to anti-skid and autobrake control. The energy balancing of the brake system reduces the serious dangers inherent in emergency braking of a high speed multi-car vehicle from speeds as high as 500 km/h, or higher, which can be achieved by MAG-LEV trains.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A brake energy balancing system for applying and controlling a plurality of wheel brakes independently of operator brake application, said system comprising:

a plurality of wheel brake assemblies, each of said wheel brake assemblies having at least one wheel and at least one wheel brake;

torque signal generating means for producing brake torque signals that are a function of the braking torque applied to each said wheel brake;

command brake torque signal generating means for generating a command brake torque signal in response to a deceleration command;

torque comparison means for comparing said brake torque signals with said command brake torque signal for generating brake torque difference signals indicative of the difference between said brake torque signals and said command brake torque signal;

brake application means for applying brake torque to each said wheel brake independently of operator brake application; and control means for providing an energy balancing control signal to said brake application means to control said brake application means independent of operator brake application, in response to said brake torque difference signals.

2. The brake energy balance system of claim 1, wherein said command torque signal generating means comprises autotorque reference generating means for generating a reference torque signal for limiting said command brake torque signal.

3. The brake energy balancing system of claim 1, further comprising:

wheel velocity signal generating means for producing wheel velocity signals that are a function of the rotational speed of each said wheel;

wheel velocity averaging means for generating an average velocity signal based upon said wheel velocity signals for each said wheel for each said wheel brake assembly;

autobrake velocity reference generating means for generating a reference velocity signal in response to a deceleration command;

comparison means for comparing said average velocity signal for each of said wheels for each said wheel brake assembly with said reference velocity signal for generating average velocity error signals indicative of the difference between said average wheel velocity signals and said reference velocity signal; and wheel velocity comparison means for comparing said average wheel velocity signals with said reference velocity signal for generating individual wheel velocity error signals indicative of the difference between said average wheel velocity signals and said reference velocity signal.

4. The brake energy balancing system of claim 3, further comprising means for adjusting said brake torque signals by at least one of a proportional torque gain, an integral torque gain, and a differential torque gain.

5. A brake energy balancing system for applying and controlling a plurality of wheel brakes independently of operator brake application, comprising:

a plurality of wheel brake assemblies, each of said wheel brake assemblies having at least one wheel and at least one wheel brake;

wheel velocity signal generating means for producing wheel velocity signals that are a function of the rotational speed of each said wheel;

wheel velocity measurement means for generating an average velocity signal based upon said wheel velocity signals for each said wheel for each said wheel brake assembly;

command brake torque signal generating means for generating a command brake torque signal for limiting said command brake torque signal;

torque comparison means for comparing said brake torque signals with said command brake torque signal for generating brake torque difference signals indicative of the difference between said brake torque signals and said command brake torque signal;

autobrake velocity reference generating means for generating a reference velocity signal in response to a deceleration command;

comparison means for comparing said average velocity signal for each of said wheels for each said wheel brake assembly with said reference velocity signal for generating average velocity error signals indicative of the difference between said average wheel velocity signals and said reference velocity signal;

torque signal generating means for producing brake torque signals that are a function of the braking torque applied to each said wheel;

wheel velocity comparison means for comparing said average wheel velocity signals with said reference velocity signal for generating individual wheel velocity error signals indicative of the difference between said wheel velocity signals and said reference velocity signal;

brake application means for applying braking torque to said wheel brakes independently of operator brake application; and control means for providing an energy balancing control signal to said brake application means to control said brake application means independent of operator brake application, in response to said average velocity error signals, said individual wheel velocity error signals, and said brake torque difference signals.

6. The brake energy balancing system of claim 5, further comprising means for adjusting said brake torque signals by at least one of a proportional torque gain, an integral torque gain, and a differential torque gain.

7. A method of balancing brake energy for applying and controlling a plurality of wheel brakes independently of operator brake application, comprising the steps of:

measuring brake torque of plurality of wheel brakes for a plurality of wheels and generating brake torque signals that are a function of the brake torque applied to each said wheel;

comparing said brake torque signals with a command brake torque signal and generating brake torque difference signals indicative of the difference between said brake torque signals and said command brake torque signal;

applying brake torque to said wheel in response to a deceleration command; and providing an energy balancing brake application control signal to control said application of brake pressure, independent of operator brake application, in response to said break torque difference signals.

8. The method of claim 7, further including the step of generating said command brake torque signal by generating a reference torque signal for limiting said command brake torque signal to a range of torque values appropriate for braking between a maximum load and a minimum load.

* * * * *